United States Patent [19]
Klein

[11] Patent Number: 6,014,141
[45] Date of Patent: Jan. 11, 2000

[54] METHOD AND APPARATUS FOR SELECTIVELY DISPLAYING A PARAMETER IN A SEPARATE STATUS PANEL

[75] Inventor: Dean A. Klein, Eagle, Id.

[73] Assignee: Micron Electronics, Inc., Nampa, Id.

[21] Appl. No.: 08/827,042

[22] Filed: Mar. 25, 1997

[51] Int. Cl.[7] .................................................. G06F 3/00
[52] U.S. Cl. .............................. 345/349; 345/3; 345/353; 713/340
[58] Field of Search ................................. 345/326–358, 345/970, 977, 34, 1–5; 341/24; 396/203; 395/750.08, 182.2; 713/340

[56] References Cited

U.S. PATENT DOCUMENTS

| | | | |
|---|---|---|---|
| 4,841,280 | 6/1989 | Hermann et al. ...................... | 345/35 X |
| 5,459,671 | 10/1995 | Duley .................................. | 345/970 X |
| 5,613,135 | 3/1997 | Sakai et al. .......................... | 345/970 X |
| 5,640,176 | 6/1997 | Mundt et al. ........................ | 345/348 X |
| 5,691,742 | 11/1997 | O'Conner et al. ................... | 345/970 X |
| 5,782,805 | 7/1998 | Meinzer et al. ..................... | 345/970 X |

OTHER PUBLICATIONS

"New Notebook: Micro Electronics, Inc., Introduces 120MHz PENTIUM Multimedia Notebook", EDGE: Work-Group Computing Report, Edge Publishing., p. 24(1), Feb. 12, 1996.

Millennia TransPort™ User's Guide, 1996, Micron Electronics, Inc.

*Primary Examiner*—John E. Breene
*Attorney, Agent, or Firm*—Dorsey & Whitney LLP

[57] ABSTRACT

The present invention relates to the use of a parameter display region, separate from the display screen, for both the normal display of primary computer parameter(s) and the selective display of a secondary computer parameter under control of a user. A primary parameter, e.g., battery charge level, is normally displayed on a parameter display region with a set of icons, wherein the number or configuration of activated icons corresponds to the relative magnitude or level of the parameter. When a secondary parameter, such as the computer speaker volume, is checked or adjusted by a user, the set of parameter display region icons is then utilized to display the secondary parameter. A controller, by executing a keyboard service program, causes the parameter display region to normally display the primary parameter. In response to a secondary parameter check or adjustment selection command, the controller directly implements the secondary parameter display and causes the parameter display region to replace display of the primary parameter with display of the secondary parameter. After a predefined amount of time has elapsed since the selection command for checking or adjusting the secondary parameter, the controller causes the parameter display region to revert back to displaying the primary parameter.

51 Claims, 7 Drawing Sheets

METHOD AND APPARATUS FOR SELECTIVELY DISPLAYING A PARAMETER IN A SEPARATE STATUS PANEL

TECHNICAL FIELD

The present invention relates generally to the display of the level of a selected parameter (e.g., speaker volume) for a personal computer. In particular, the present invention relates to selectively displaying parameter adjustment levels on a multi-purpose parameter display region (separate from the main display screen) when the parameter is being adjusted and normally displaying a default system parameter when no parameter is being adjusted.

BACKGROUND OF THE INVENTION

To meet the needs of computer users, portable personal computers (i.e., "laptop" computers) have improved dramatically in their computing ability, while at the same time, being reduced in their overall physical size. Like desktop personal computers, laptops include various system or interface parameter adjustments, such as screen display brightness, screen display contrast, speaker volume and beep volume. Because of the need to maintain the laptop's compact attributes, it is desirable to implement these adjustments with keyboard keystroke combinations, rather than with added, space-consuming switches or adjustable controls. Unfortunately, however, users are not always able to observe the magnitude of the parameter or track its adjustment because of the lack of observable adjustable controls and because space limitations prevent the addition of individual display apparatus for monitoring such parameters. In addition, it is preferable to avoid using the laptop's main screen display for this purpose, in order to preserve CPU resources for more important, primary functions of the computer system.

Some laptop computers do, however, utilize a small LCD status panel that is distinct from the main screen display. These status panels include icons that are dedicated to the display of specific system parameters (e.g., AC active, battery charge level, etc.). It is important to continue displaying the status of certain of these parameters. For example, the battery supply used to power a laptop computer has a finite amount of electrical charge that will be consumed as the computer is being operated. Thus, it is desirable for users to be able conveniently and continuously to monitor battery charge level while operating the laptop, in order to properly pace computer work-time relative to the reoccurring need to "charge" the battery supply.

Unfortunately, not enough space is available on such status panels for the continuing display of all possible system parameters that are of interest to a user. Therefore, laptop systems limit display to "primary parameters", which are those parameters that are deemed worthy enough to be normally displayed on the status panel. However, it would be beneficial also to be able to display "secondary parameters" (i.e., those parameters not receiving sufficient priority for continuing status panel display) at selected times. For example, an interface function such as speaker volume could be considered a secondary parameter. Its relative magnitude is not necessarily of continuing interest to a user once the level has been set. However, most users would wish to have the magnitude level available for display at their selection.

Accordingly, it would be desirable to display to a user the status of a personal computer's secondary parameters without having to add additional status panel space to the computer's visible working surface.

SUMMARY

The present invention relates to the use of a parameter display region for: (1) the normal display of primary parameter(s) and (2) the selective display of a secondary parameter under control of a user. In one embodiment, a primary parameter (e.g., battery charge level) is normally displayed on a parameter display region with a set of icons, wherein the number or configuration of activated icons corresponds to the magnitude or level of the primary parameter. When a secondary parameter, such as the computer speaker volume, is checked or adjusted by a user, the set of parameter display region icons is then utilized to display the secondary parameter initially and as it is adjusted, if it is to be adjusted. In this manner, the magnitudes or levels of a wide variety of secondary parameters may be selectively displayed on a limited area of the computer's user interface.

In one embodiment of the invention, a controller, by executing a keyboard service program, causes the parameter display region to normally display the primary parameter. In response to a secondary parameter selection command, which may be initiated by a particular keystroke combination, the controller implements the secondary parameter command and causes the parameter display region to replace the display of the primary parameter with a display of the secondary parameter and causes the secondary parameter to be adjusted if it is to be adjusted while continuing to display it upon the parameter display region. In another embodiment, after a predefined amount of time has elapsed since the command for checking or adjusting the secondary parameter, the controller causes the parameter display region to revert back to displaying the primary parameter.

DETAILED DESCRIPTION

Figure 1:
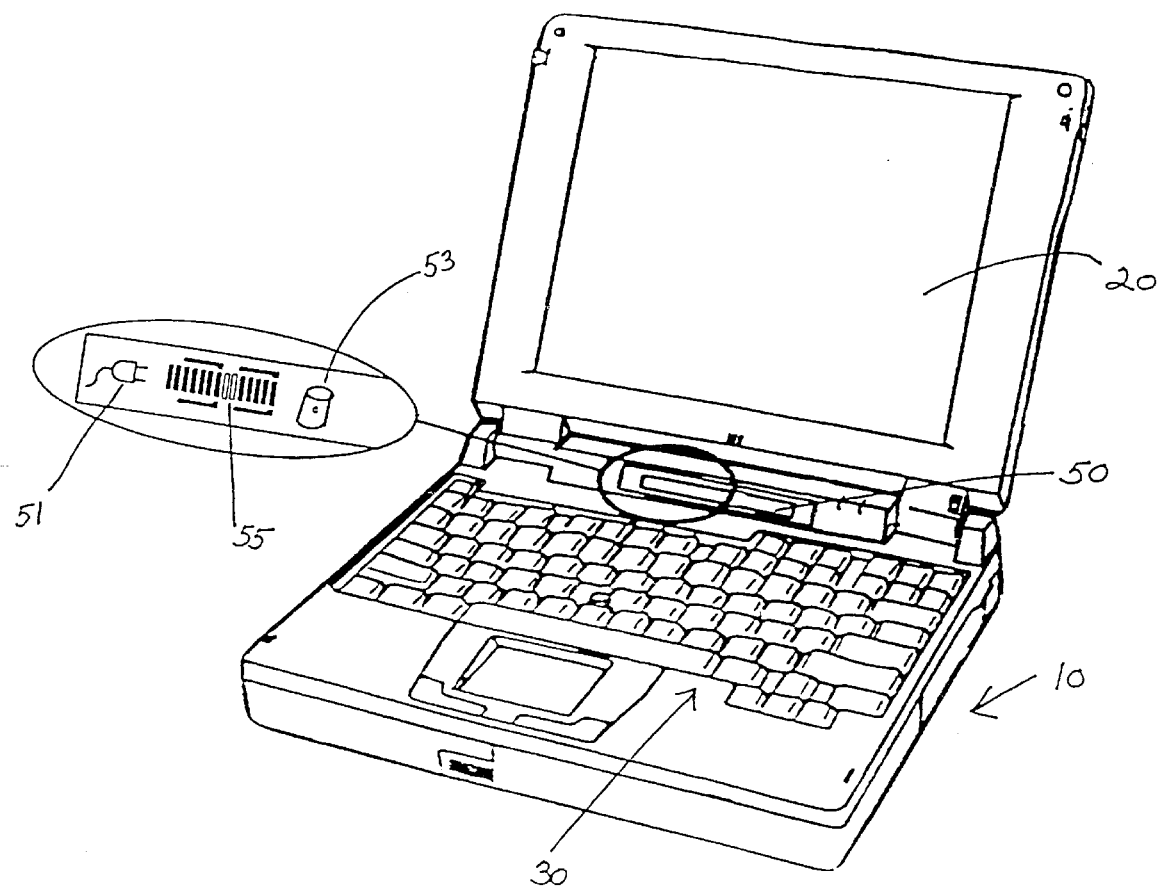
FIG. 1 is a perspective view of a portable personal computer illustrating a highlighted and enlarged parameter display region.

FIG. 1 shows a portable personal computer 10 (i.e., a "laptop" computer) having a screen display 20, a keyboard 30 and a status panel 50 (e.g., a liquid crystal display "LCD" panel, such as a Model M1000 available from Micron Electronics, Inc. of Nampa, Id.). With further reference to FIGS. 4A through 4D, the status panel 50 includes pictorial icons and other graphical symbols, which convey to a user information relating to various parameters, i.e., functions and subsystems of the computer 10. For example, an AC active icon 51 appears on the status panel 50 when the computer 10 is being powered with alternating current ("AC"), as opposed to a direct current ("DC") battery power supply. The HDD C active icon 53 appears when the computer's hard disk drive ("HDD") C is in operation. Finally, with particular relevance to the present invention, the status panel 50 also includes a parameter display region 55, which is utilized for normal display of primary parameters and selective display of a secondary parameter. Along the lower edge of the parameter display region 55 is a short sequence of displayable letters "BATT1VOLCONBRGTBATT2" comprising label bar 59. (The label bar 59 could also consist of a set of pictorial icons or other indicia recognizable as identifying particular secondary parameters to be displayed.) Selected portions of this bar 59 can be illuminated to provide indicia to identify the parameter(s) being displayed.

In general, any system parameter (e.g., component status, available memory, elapsed time, speaker/beep volume, screen settings, and the like) can be either a primary or a secondary parameter. Primary and secondary parameter designations are subjectively defined by a system designer or user. Primary parameters are those parameters that are chosen for normal (default or continuing) display on the parameter display region 55, while secondary parameters are the remaining parameters that are designated for selective display, such as while being checked or adjusted.

For example, in one system configuration, the battery charge level could be designated as a primary parameter and the user interface parameters could be designated as secondary parameters. (User interface parameters are sensory or response parameters associated with an interface between the computer system and the user. Such parameters would include, for example, speaker volume and screen contrast.) With this configuration, the parameter display region would display the battery charge level until a secondary parameter was selected, at which time, the selected secondary parameter would then be displayed upon the parameter display region 55. On the other hand, in another system configuration, the speaker volume, for example, could be designated as the primary parameter and the battery charge level, along with other system parameters, would be secondary parameters.

In the depicted embodiment, the parameter display region 55 normally displays relative battery charge levels as primary parameters and selectively displays the relative magnitude of an interface function, e.g., speaker volume, as a secondary parameter.

The parameter display region 55 includes mode indicator icons 56 and 57, along with magnitude icons 58, which are used to convey both primary and secondary parameter magnitudes. These icons 58 may be divided into multiple sets, as is demonstrated below, for displaying more than one primary or secondary parameter at a time upon the parameter display region 55. One feature of the present invention is that these primary and secondary parameter icon sets can utilize common icons from the overall set of magnitude icons 58. Therefore, the area required to alternately display primary and secondary parameters upon the parameter display region 55 can be minimized. In addition, while the depicted embodiment incorporates bar shaped magnitude icons 58, persons of ordinary skill will recognize that any icon type (e.g., dots, stars, dashes, etc. ) that are capable of conveying magnitude will suffice as magnitude icons 58. Furthermore, magnitude icons could be icons such as vertical and horizontal line segments that when activated in a particular combination, represent alpha-numeric characters, which can convey primary and secondary parameters.

In one embodiment of the present invention, mode icons 56 and 57 correspond to Batteries I and II 43, 45, respectively. These battery mode icons 56, 57, together with the "BATT1" and "BATT2" indicia in label bar 59, appear upon the status panel 50 when the parameter display region 55 is in primary parameter or battery mode (i.e., no secondary parameter is selected for display), identifying that the magnitude icons 58 indicate battery charge rather than the magnitude of any secondary parameter. Conversely, the battery mode icons 56, 57 disappear when a secondary parameter is being displayed, indicating that the icons 58 are conveying the magnitude of the selected secondary parameter. The selected secondary parameter may also be identified by indicia such as letters in the label bar 59. This is particularly helpful to novice users who may be uncertain as to the hot key combinations required for various secondary parameters.

Figure 2:
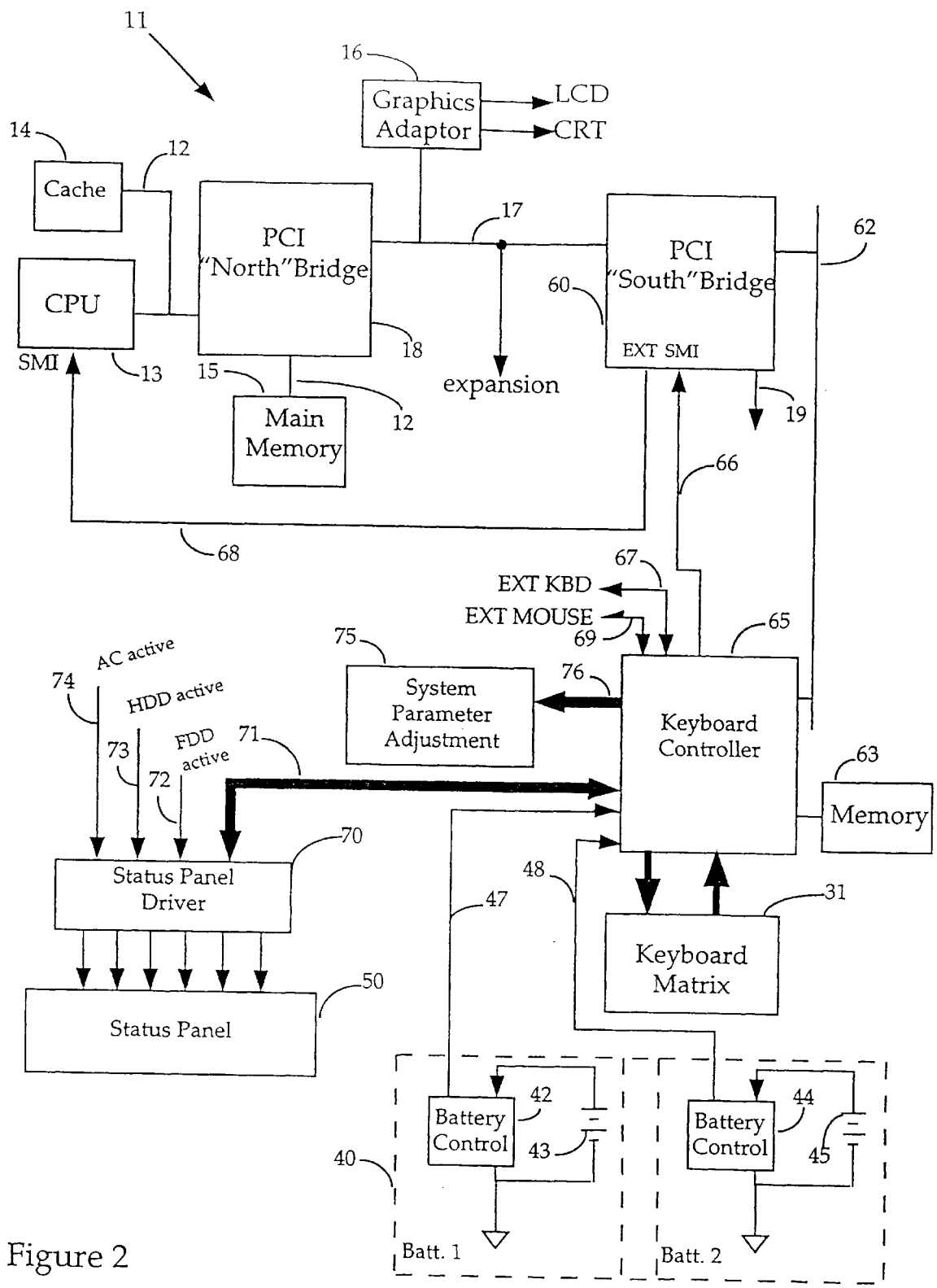
FIG. 2 depicts a block diagram of components of a personal computer, which may be utilized to implement the present invention.

FIG. 2 shows a block diagram of a computer system 11 corresponding to the personal computer 10, which is suitable for practicing the invention. The computer system 11 includes a local bus 12, which interconnects central processing unit ("CPU") 13, cache memory 14 and (via bridge 18) main memory 15 to one another. The CPU 13 processes programs that are stored in cache memory 14 and main memory 15. For example, portions of an operating system program, (e.g., WINDOWS 95), which control and supervise the operation of the whole computer, are stored in main memory 15 when the computer is in operation. A peripheral component interconnect ("PCI") bridge 18, the "North Bridge", serves as an interface between the local bus 12 and a PCI bus 17, which is connected to the peripheral components of the system 11. (It should be noted that while this embodiment utilizes a PCI bus architecture, a person skilled in the art will recognize that the present invention may be implemented with other system architectures.) A graphics adapter 16 is connected directly to the PCI bus 17. The graphics adapter 16 provides a video signal to a screen display 20, which could be a conventional video display such as an LCD or a cathode ray tube ("CRT") monitor. Also connected to the PCI bus 17 is a second PCI bridge 60, the "South Bridge," which may be implemented with an Intel MPIIX module (e.g., Intel Model 82371MX). The South Bridge 60 acts as an interface between the PCI bus 17 and a keyboard controller 65 (which may be implemented with a microcontroller such as an Intel 80C51SL, a Mitsubishi M38802M2HP, a Hitachi H8, or the like) via an ISA bus 62. This enables the keyboard controller 65 to communicate with the CPU 13. In addition, signal lines 66, 68, by way of the South Bridge 60, provide to the keyboard controller 65 System Management Interrupt ("SMI") access to the computer's operating system via the CPU 13. Finally, IDE bus 19 connects the South Bridge 60 to any hard disk drive or CD-ROM drive that is present.

The keyboard controller 65 receives and processes input signals (e.g., user secondary parameter selection commands) from various devices including a keyboard matrix 31 (corresponding to keyboard 30), an external keyboard 67 and an external mouse 69. A keyboard service program 100, as will be discussed in greater detail later, is stored in memory 63 and executed by the keyboard controller 65. The keyboard matrix 31 provides to the keyboard controller 65 signal information indicating which keys from the keyboard 30 have been actuated by a user. The keyboard controller 65 is also connected to system parameter adjustment module 75 by way of adjustment control bus 76. The system parameter adjustment module 75 represents the array of control circuitry for digitally-controlled system parameters, which include various interface functions, e.g., speaker volume, screen display brightness, and screen display contrast. As is known in the art, for some functions, the operating levels may be digitally controlled directly, as is the case, for example, with LCD screen display brightness and contrast. With other functions such as speaker volume, digital-input adjustment devices (e.g., digital-to-analog converters, Dallas Semiconductor electronic potentiometers, and/or XICOR $E^2POTs$), can be utilized to provide the controller 65 control access to these functions. Therefore, keyboard controller 65 is able to control directly the operating levels of these system parameters through control bus 76.

A battery supply module 40 includes batteries 43, 45, which are connected to the computer's power supply unit (not shown), and are utilized for powering the computer system 11 when AC power is not being used. The batteries 43, 45, are connected in parallel with control modules 42, 44, respectively (which could be implemented with smart battery control modules providing pack status on the SM-bus, available from Benchmarq Microelectronics, Inc., Dallas, Tex.). Monitoring the charge levels of the batteries 43, 45, the battery control modules 42, 44 provide the keyboard controller 65 with charge level signals 47 and 48, whose magnitudes correspond to the charge levels of their associated batteries 43, 45, respectively.

Also included within the computer system 11 is the status panel 50, which may be implemented with an LCD display. The status panel 50 is connected to and controlled by a status panel driver 70 (e.g., an EM Microelectronic V6108). The status panel driver 70 receives a variety of input command signals corresponding to particular parameter icons which appear upon the status panel 50. For example, AC active signal 74, HDD active signal 73, and FDD (floppy disk drive) active signal 72 are input to the status panel driver 70. When activated, these signals cause their respective icons to appear upon the panel 50, thus indicating the status of their corresponding system function. In addition, parameter display bus 71 is connected between the keyboard controller 65 and the status panel driver 70. The parameter display bus 71 provides to the status panel driver 70 signal information that causes the appropriate parameter display region 55 icons to appear upon the status panel 50 and activates a portion of label bar 59 corresponding to the displayed secondary parameter.

a. Parameter Display Region

Figure 4A:
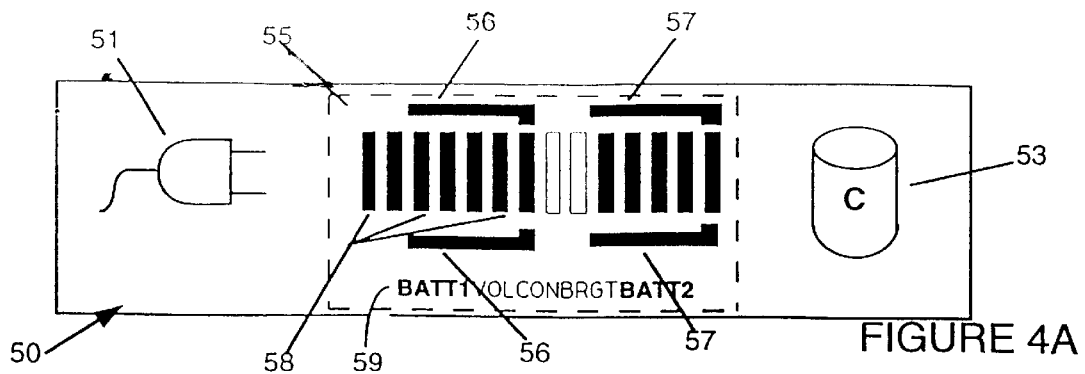
FIGS. 4A–4D depict portions of status panels having, in various states of display, parameter display regions.

With one embodiment of the present invention, the parameter display region 55 is utilized to normally display, as primary parameters, battery charge levels and to selectively display, as secondary parameters, interface parameters. When the parameter display region 55 is in Primary Parameter Display Mode, the battery mode icons, 56, 57, are activated and the activated magnitude icons 58 convey the relative charge levels. With specific reference to FIG. 4A, a user is informed that the parameter display region 55 is in battery mode not only because Battery I Mode indicator icon 56 and Battery II Mode Indicator icon 57 appear on the status panel 50 but also because the "BATT1" and "BATT2" indicia in label bar 59 are activated. In this mode, the number of visible magnitude icons 58 associated with each of the Battery Mode indicator icons 56, 57, corresponds to the relative charge levels of Battery I, 43 and Battery II, 45, respectively. For example, the parameter display region of FIG. 4A indicates that Battery I is charged to a level of 100% (its seven magnitude bars 58 are active) and Battery II is charged to a level of approximately 71% (five of its seven magnitude bar icons 58 are active). FIG. 4A also shows active icon 51, indicating AC power is being supplied. By comparison, FIG. 4B indicates that Battery I is charged to a level of approximately 43% (three of its seven magnitude bar icons 58 are active), while Battery II is charged to a level of 100% (all seven of its magnitude bar icons 58 are active). Note also in FIG. 4B that the computer 10 is being powered by the batteries 43, 45, because the AC active icon 51 does not appear upon the status panel 50.

Figure 4B:
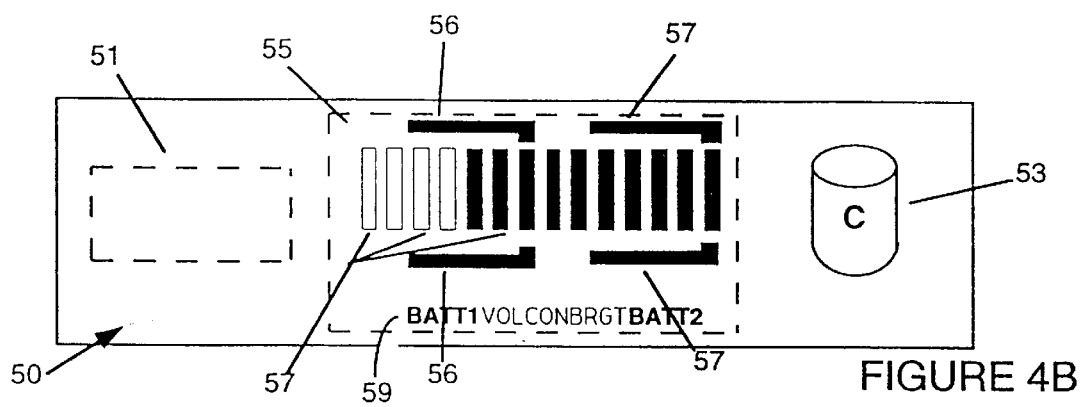
Figure 4C:
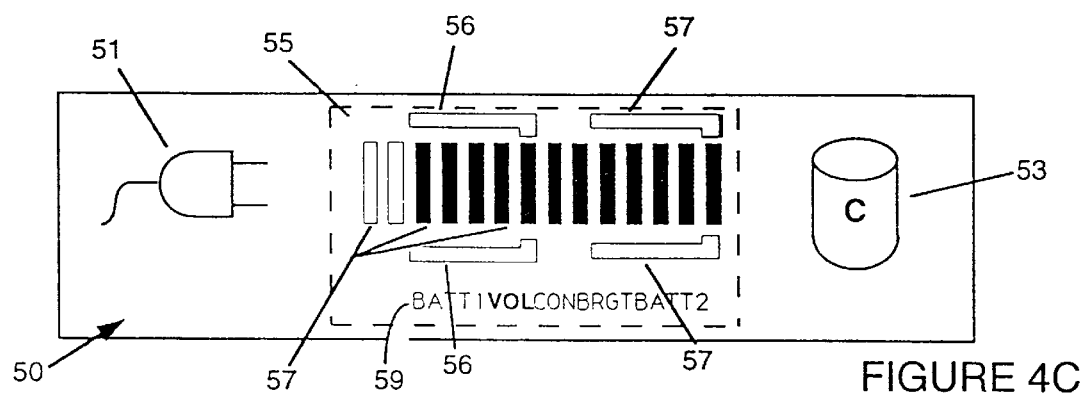
Figure 4D:
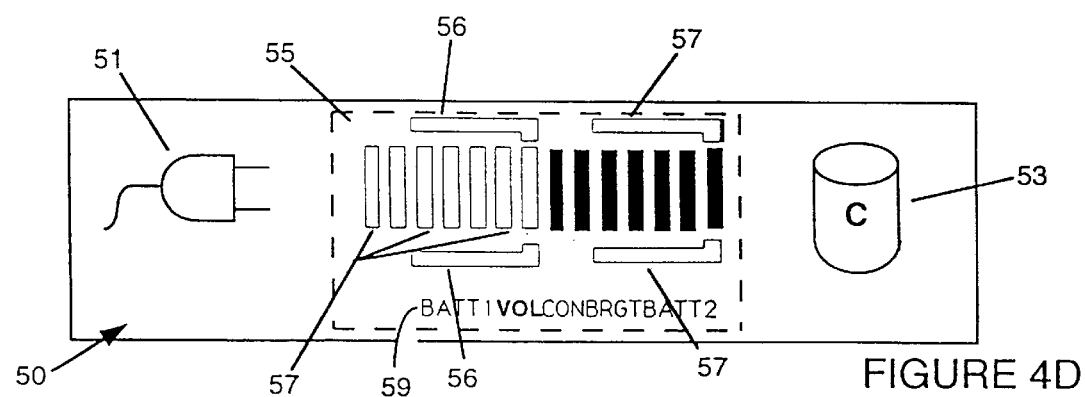

When a user checks or adjusts a secondary parameter (e.g., an interface parameter, such as speaker volume), the parameter display region 55 changes to Secondary Parameter Display Mode. In this mode, the magnitude icons 58 convey the relative magnitude of the secondary parameter that is being or has recently been checked or adjusted. The Battery Mode indicator icons 56, 57 disappear from the status panel 50, thereby indicating that all fourteen magnitude icons are displaying the secondary parameter relative magnitude. Moreover, an appropriate string of letters in label bar 59 is activated to show which secondary parameter is being displayed, e.g., appearance of "VOL" indicates volume is being displayed. For example, FIG. 4C indicates that the selected secondary parameter is at a level of approximately 86% of maximum (twelve of the fourteen magnitude icons 58 are active), whereas FIG. 4D depicts a secondary parameter at a relative magnitude of 50% of maximum (seven of the fourteen magnitude icons are active).

b. Secondary Parameter Display and Adjustment

Figure 3:
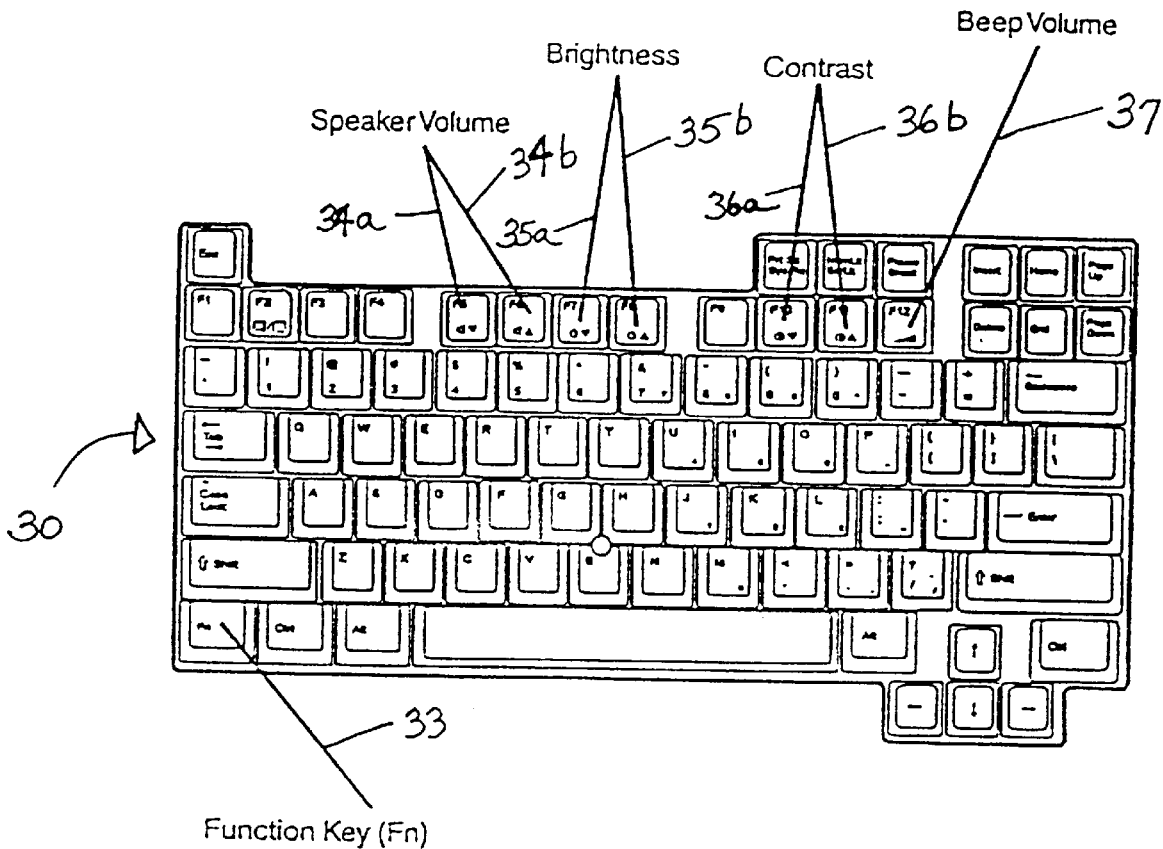
FIG. 3 is a top view of a keyboard for a portable personal computer for use with the present invention.

FIG. 3 shows a keyboard having a number of keys used for secondary parameter Adjustment/Check, including a Function key 33, Speaker Volume up/down keys 34a, 34b, Brightness up/down keys 35a, 35b, Contrast up/down keys 36a, 36b, and a Beep Volume key 37. These keys may be utilized for checking or adjusting their associated system parameters. With one embodiment of the present invention, a "hot key" methodology is implemented, wherein the Function key 33 is depressed to issue a selection command for a secondary parameter to be checked or adjusted. For example, to decrease the computer's speaker volume, one would depress the Speaker Volume Down key 34a while depressing the Function key 33 until the speaker volume level, as represented by the parameter display region 55 of the status panel 50, is at an acceptable level. Before depressing these keys, the parameter display region 55 would be in Primary Parameter Display mode, as represented in FIGS. 4A and 4B. After initial key depression and debouncing, the parameter display region 55 changes to Secondary Parameter Display Mode and initially appears as depicted in FIG. 4C with a relative volume level of 86%. After the keys have either been sufficiently debounced a number of separate times or have remained debounced for an extended period of time, the keys are interpreted as calling for parameter adjustment and the volume level is incrementally adjusted (in this example reduced to 50%, as is depicted in FIG. 4D). After the keys have been released for a period of time, the parameter display region 55 reverts back to Primary Parameter Display mode and again displays the relative charge levels of the batteries.

Figure 5:
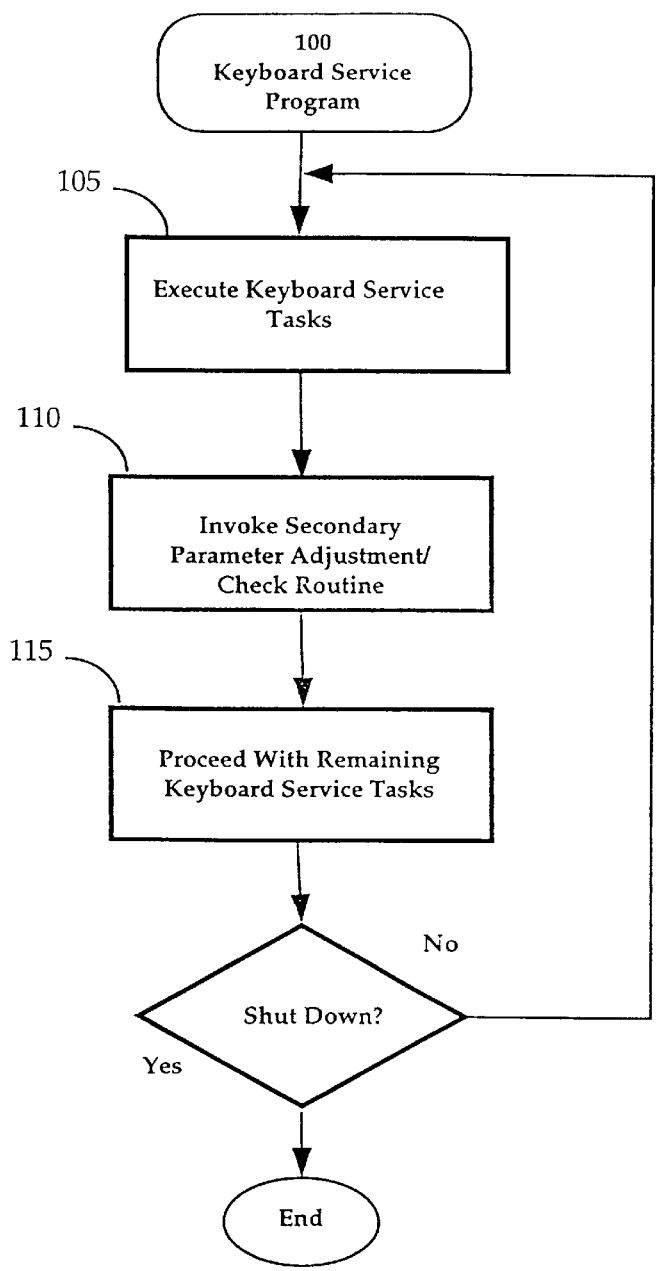
FIG. 5 depicts a flow chart of steps performed by a keyboard service program, including invoking a software routine used to implement the present invention.

In order to implement one embodiment of the present invention, a keyboard controller service program 100, as is depicted in the flow chart of FIG. 5, is executed by the keyboard controller 65. Persons skilled in the art will be familiar with such loop programs which are commonly utilized to implement various keyboard functions cyclically. Such a program is modified to implement the present invention. At step 105 the program executes various tasks, which are common to keyboard controller service programs. Next, at step 110, the service program 100 invokes a Secondary Parameter Adjustment/Check routine. In general, this routine 110 determines, through debouncing of an appropriate keyboard combination, whether a user is selecting a secondary parameter for check or adjustment. If such a key combination is debounced (and depressed for a sufficient amount of time), the routine 110 causes the controller 65 to adjust the selected secondary parameter and causes the parameter display region 55 to display its initial and then its incrementally adjusted relative magnitudes within the parameter display region 55. If a secondary parameter adjustment key combination is not debounced, the routine 110 either causes the parameter display region 55 to continue displaying for a brief period a previously selected secondary parameter adjustment or, if enough time has elapsed since an adjustment occurred, it causes the status panel 50 to display the primary parameter(s), e.g., battery charge levels. Finally, when the Secondary Parameter Adjustment/Check routine 110 has been completed, control returns to the service program 100, which proceeds at step 115 to execute the remaining loop functions before the next pass is initiated through the loop program 100.

c. Secondary Parameter Adjustment/Check Routine

Figure 6A:
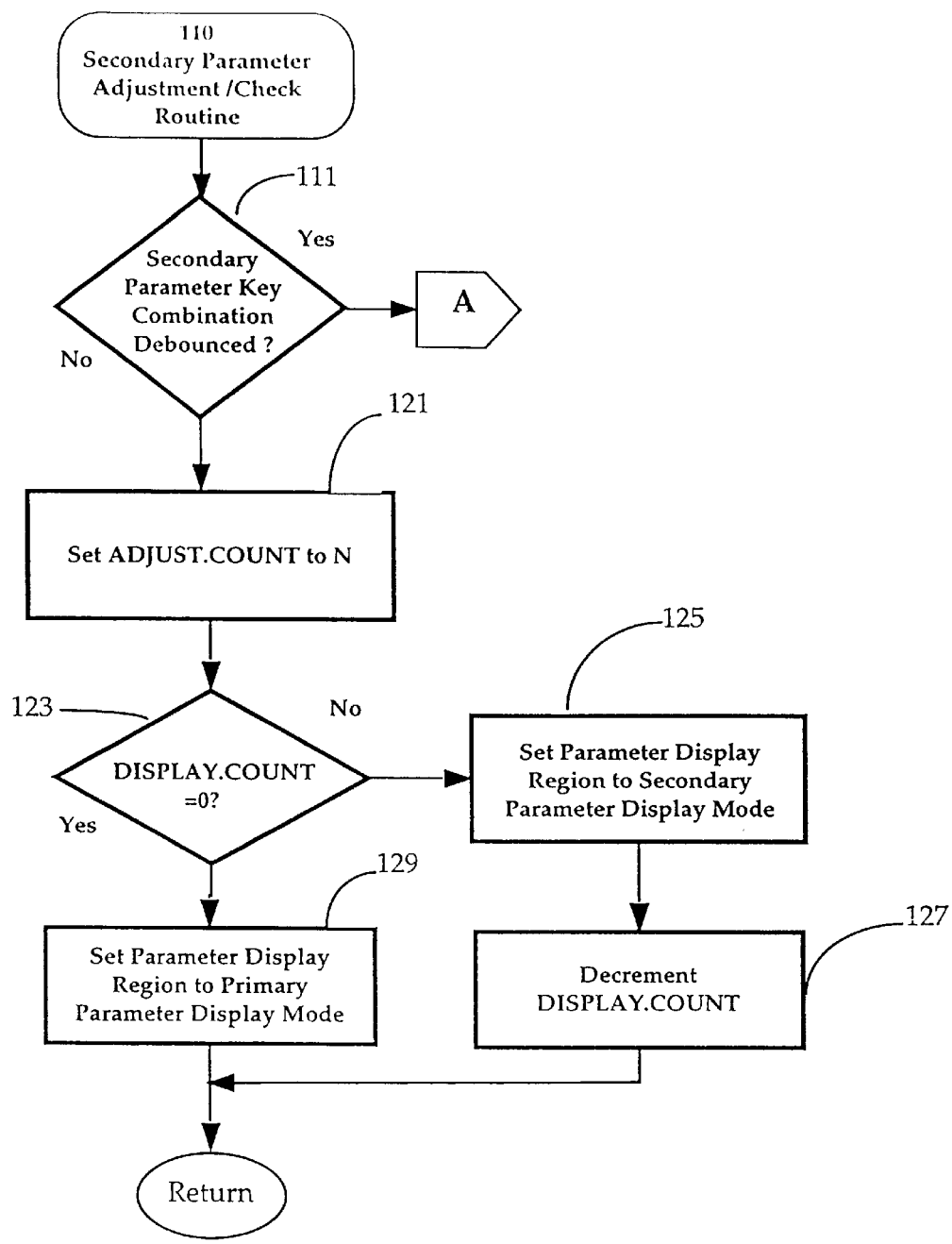
FIGS. 6A and 6B depict a flow chart of the steps performed by a Secondary Parameter Adjustment/Check routine.
Figure 6B:
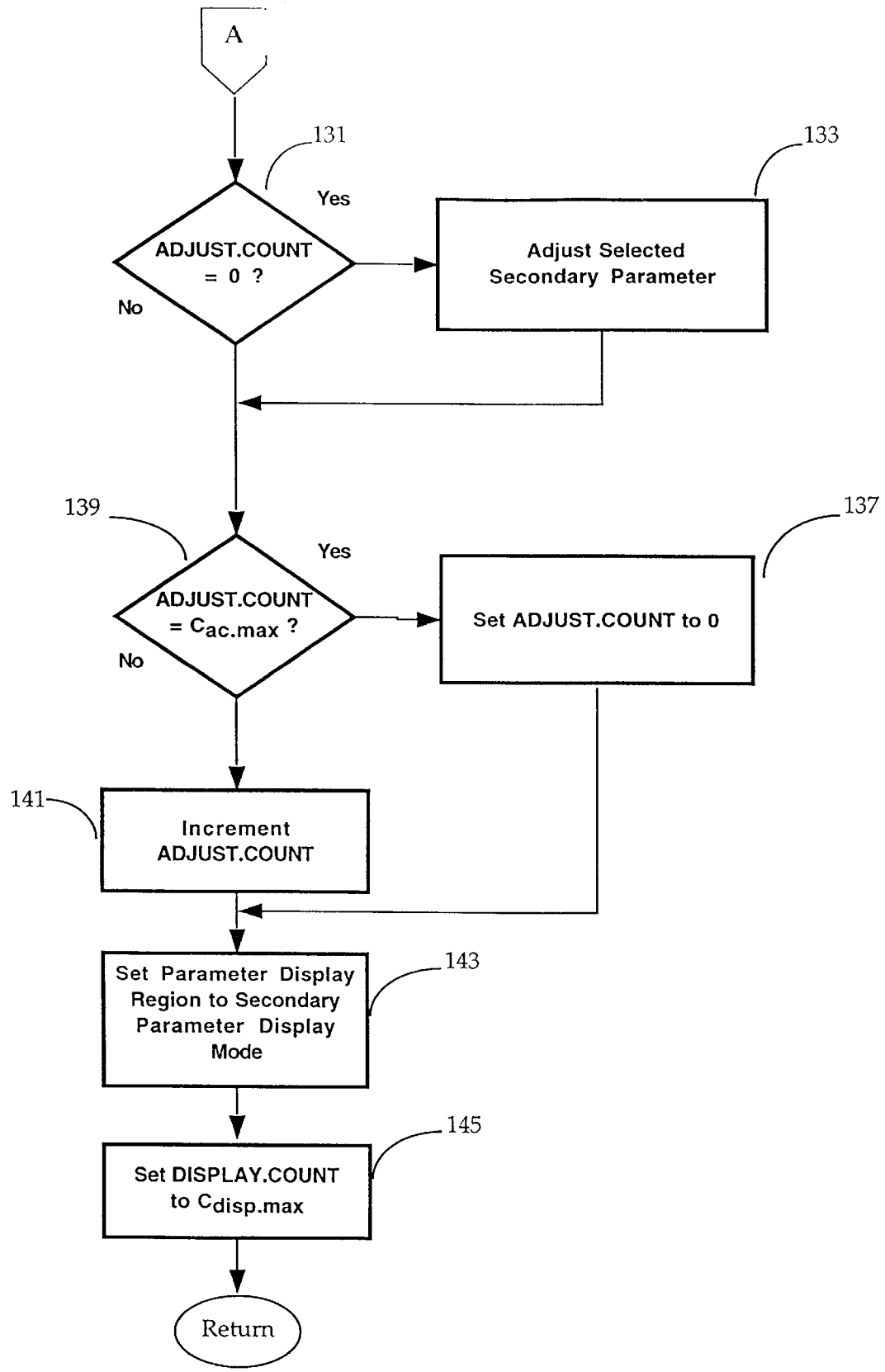

FIGS. 6A and 6B show a flow chart of an embodiment of the Secondary Parameter Adjustment/Check routine 110. The primary purposes of this routine are: (1) to recognize when the user is selecting a secondary parameter for display; (2) to recognize if the user wishes to adjust the selected secondary parameter; (3) to execute incremental adjustment (i.e., increment or decrement) of the selected parameter in a manner the user can track; (4) to recognize when the user is no longer selecting a secondary parameter for check-parameter display or adjustment; and (5) to maintain display of the selected secondary parameter for a brief period after it is no longer selected.

To perform these functions, the routine may use two counters. The first counter is for a variable ADJUST.COUNT that counts up from a predefined value N to a predefined rollover value $C_{ac.max}$. The value $C_{ac.max}$ is selected to provide a time period delay before a successive adjustment occurs while Secondary Parameter Adjustment/Check keys are continuously being depressed by a user. The second counter is for a variable DISPLAY.COUNT that counts down from a set value $C_{disp.max}$. The value $C_{disp.max}$ is selected to provide a time period delay before a currently displayed secondary parameter is removed from display. Together, these variables permit a user to enter a selection command with a key "quick tap" that is sufficient to cause display of a desired secondary parameter without adjustment. If the user chooses to hold the selection command through a sufficient number of Service Program loop cycles (i.e., $C_{ac.max}$–N+1), then the selection command results in one or more incremental adjustments of the selected secondary parameter. The secondary parameter remains on display during such adjustment and for a brief period thereafter.

Initially, at step 111 the routine determines whether a secondary parameter key combination (e.g., activation of both the Function key 33 and the Speaker Volume up key 34b) has been debounced. If a secondary parameter key combination has been debounced, the routine at step 131 (FIG. 6B) then determines whether the ADJUST.COUNT variable is equal to zero. Because the normal time period for each Service Program 100 loop cycle is minuscule (measured in milliseconds) as compared with the average amount of time a key combination for a selection command can be depressed by a user, the ADJUST.COUNT variable is utilized to allow a check-parameter display without adjustment and to prevent successive incremental adjustments from occurring too rapidly. If this count variable is equal to zero at step 131, the selected secondary parameter is then adjusted at step 133. Typically, the adjustment is a change of one discrete value on the adjustment scale (i.e., it is either incremented or decremented). (As will be discussed later, at step 121, the ADJUST.COUNT variable is set or reset, as the case may be, to N when no secondary parameter key combination is being depressed.)

At step 139 the routine determines whether ADJUST.COUNT is equal to the predefined value $C_{ac.max}$. If ADJUST.COUNT is not equal to $C_{ac.max}$, indicating that the minimal time before and between secondary parameter adjustments has not elapsed, it is incremented at step 141. On the other hand, if ADJUST.COUNT is equal to $C_{ac.max}$ (indicating that the key combination has been continually depressed for a sufficient amount of time to allow the main loop 100 to invoke the Secondary Parameter Adjustment/Check routine $C_{ac.max}$ times), ADJUST.COUNT is set to zero at step 137, thereby allowing for a secondary parameter adjustment to occur the next time step 131 is invoked if the key combination has not been released. Whether step 137 or step 141 is executed, the parameter display region 55 (which may or may not already be in Secondary Parameter Display Mode) is set to Secondary Parameter Display Mode by the keyboard controller 65 at step 143. The parameter display region 55 displays (or continues to display) the selected secondary parameter and the corresponding portion of label bar 59. Next, at step 145, the DISPLAY.COUNT variable is set to a predefined value $C_{disp.max}$ (whose value corresponds to a set amount of time the parameter display region should remain in Secondary Parameter Display Mode, and thereby display the selected secondary parameter on the parameter display region 55). As noted, the DISPLAY.COUNT variable is utilized to ensure that the selected secondary parameter is displayed upon the parameter display region 55 for an acceptable amount of time even after the key combination for the selection command has been released. At this point, the routine returns to the loop program 100 at step 115 and proceeds to execute the remaining tasks within the loop.

When the Secondary Parameter Adjustment/Check routine 110 is invoked and a secondary parameter adjustment combination is not debounced at step 111, the ADJUST.COUNT variable is set (or, as the case may be, reset) to a predetermined value N at step 121. At step 123 it is then determined whether the DISPLAY.COUNT variable is equal to zero. If this variable is equal to zero, the parameter display region 55 is set to Primary Parameter mode, at step 129 and the parameter display region 55 then displays the primary parameter(s), e.g., charge levels of the batteries, 43, 45. However, if at step 123 the DISPLAY.COUNT is not equal to zero (indicating that a previously invoked secondary parameter selection should continue to be displayed) the parameter display region 55 is set to (or remains in) Secondary Parameter Display Mode at step 125; accordingly, the parameter display region 55 continues to display the secondary parameter. The DISPLAY.COUNT variable is then decremented by one at step 127 and the routine returns to the Service program 100.

When the parameter display region 55 is set to either Primary Parameter or Secondary Parameter Display Mode, at steps 125, 129 or 143, the keyboard controller 65 transmits a signal to the status panel driver 70 via parameter display bus 71. This signal transmission causes the parameter display region 55 to: (1) either activate or deactivate the mode icons 56, 57 (2) if mode icons 56, 57 are deactivated, activate an appropriate portion of label bar 59, and (3) display the appropriate number of magnitude icons 58 corresponding to either the primary parameter (e.g., battery charge level) or the magnitude of a selected secondary parameter, depending upon the current parameter mode. Pursuant to step 133, when any secondary parameter is to be adjusted (incremented or decremented), the keyboard controller 65 transmits a control signal to the system adjustment module 75 via control bus 76, causing the selected secondary parameter to be appropriately adjusted.

With this embodiment of the Secondary Parameter Adjustment/Check routine 110, a user may adjust a selected secondary parameter by both successively "tapping" the appropriate key combination until an increment is shown, as well as by continuously depressing (i.e., holding down) the selected combination. In addition, the user can merely display the selected parameter without adjusting it by implementing a "quick tap" of the key combination.

Because every key combination for a selection command is necessarily preceded by a state where the key combination is not yet debounced, the ADJUST.COUNT variable will always have been reset to N at step 121 prior to the user's invocation of a key combination. (Again, it must be remembered that the time period for each service program 100 cycle is much smaller than reaction and key depression times associated with a human user. Thus, it can be assumed that numerous Secondary Parameter Adjustment/Check routine 110 invocations will occur prior to, during, and after a user depresses a selected secondary parameter key combination.) Therefore, the adjustment delay duration of the hold-down of a key combination (for the first adjustment after initial key depression) is proportional to the value $C_{ac.max}$–N+1. Each time a secondary parameter key combination is "tapped" long enough for $C_{ac.max}$–N+1 Service Program loop cycles to occur, the selected secondary parameter will be adjusted pursuant to step 133. In this manner, a user can make successive adjustments by repeatedly "tapping" an appropriate key combination.

On the other hand, a user could check (i.e., merely display) a secondary parameter by implementing a "quick tap" of the secondary parameter key combination to be selected. A "quick tap" is a key depression that occurs for less than $C_{ac.max}$–N+1 Service Program loop cycles. With a "quick tap", the ADJUST.COUNT variable is not allowed to attain $C_{ac.max}$ and thus, is prevented from rolling over to zero at step 139, which is necessary for an adjustment at step 131. This is so because, as mentioned above, the variable ADJUST.COUNT is set back to the value N at step 121 during the Service Program 100 loop cycle occurring immediately after the keys have been released.

The value for N should be greater or equal to zero and less than $C_{ac.max}$. It is selected so as to provide a compromise between the wait duration required for a "tap" to cause an increment of adjustment (short duration preferred) and the maximum acceptable "quick tap" duration for causing secondary parameter display without adjustment (somewhat longer duration preferred to provide the user with a greater error tolerance for excessive hold-down of the key combination). As an example, assume that $C_{ac.max}$ is equal to 2000 and that the average duration for a Service Program loop cycle is 1 msec. If N were chosen to be 1500, then a user would have to depress and release the selection keys in approximately less than 0.501 seconds for a "quick tap", which would cause the selected secondary parameter to merely be displayed and not adjusted. Conversely, the user would have to depress the keys at least 0.501 seconds for each "tap" to cause the selected secondary parameter to be adjusted and displayed.

When a user wishes to make multiple adjustments of a secondary parameter by holding down the appropriate key combination, the parameter will progressively increase or decrease and be so displayed to the user on the parameter display region 55. As the key combination is being continuously depressed, the adjustments (after the initial adjustment) will not occur too quickly because an adjustment will take place, at step 133, only one out of every $C_{ac.max}$ Service Program loop cycles. Thus, so long as $C_{ac.max}$ is sufficiently large, in connection with the average duration of a Service Program loop cycle, the delay between successive adjustments will, in turn, be acceptably large, with respect to the reflexes of the user. From the example of the previous paragraph, this delay period would equal 2 seconds (0.001 ·sec. 2000).

The duration of a Service Program 100 loop cycle will depend upon temporal system parameters such as controller clock speed and loop size. The specific values for $C_{ac.max}$, and $C_{disp.max}$ will depend upon this duration and would be selected by the system designer or computer user as a matter of preference.

While the present invention has been described with reference to one embodiment thereof, those skilled in the art will recognize various changes in form that may be made without departing from the spirit and scope of the claimed invention. For example, with the preferred embodiment of the present invention, the secondary parameter checks and adjustments are implemented by the Service Program loop of the keyboard controller, independently of the main operating system, which is executed by the CPU. However, persons of ordinary skill in the art will recognize that the present invention could also be implemented with a secondary parameter adjustment/check routine located within the computer's operating system, and invoked by a keyboard controller or interface. With this embodiment, the keyboard controller 65, after sensing actuation of an appropriate selection command (e.g., key combination), could implement such an adjustment by initiating an SMI interrupt to the CPU 13, thereby causing the operating system to initiate a secondary parameter adjustment/check routine. Accordingly, the invention is not limited to what is shown in the drawings and described in the specification but only as indicated in the appended claims.

What is claimed is:

1. A method for displaying a secondary parameter on a parameter display region of a computer having a screen display, the method comprising:

displaying on a parameter display region that is separate from the screen display a primary parameter by activating icons from a first set of icons;

receiving a selection command for a secondary computer parameter; and responsive to the command, displaying on the parameter display region the secondary parameter by activating icons from a second set of icons, wherein the first and second sets of icons have icons in common.

2. The method of claim 1 further comprising the acts of (1) determining whether the secondary parameter is to be adjusted, (2) if it is to be adjusted, adjusting the secondary parameter, and (3) displaying the secondary parameter as it is being adjusted.

3. The method of claim 2 further comprising the act of continuing to display the secondary parameter after it has been adjusted.

4. The method of claim 1, wherein the act of receiving a selection command for a secondary computer parameter occurs without assistance from an executing operating system.

5. The method of claim 4, further comprising executing a secondary parameter adjustment step by a controller in response to receiving the selection command for a secondary parameter.

6. The method of claim 5 wherein the selection command comprises user actuation of a predefined keystroke combination.

7. The method of claim 6, wherein the act of executing a secondary parameter adjustment is executed if the keystroke combination is depressed for a sufficient amount of time.

8. The method of claim 5, wherein the act of displaying on a parameter display region a primary parameter includes the act of displaying a battery charge level.

9. The method of claim 1, wherein the secondary parameter is displayed by activating an indicative number of icons in the second set of icons.

10. The method of claim 1, further comprising displaying on the parameter display region indicia identifying the secondary parameter being displayed.

11. The method of claim 4, further comprising executing a secondary parameter adjustment step by a controller in response to receiving the selection command for a secondary parameter.

12. The method of claim 5 wherein the selection command comprises user actuation of a predefined keystroke combination.

13. The method of claim 6, wherein the act of executing a secondary parameter adjustment is executed if the keystroke combination is depressed for a sufficient amount of time.

14. The method of claim 5, wherein the act of displaying on a parameter display region a primary parameter includes the act of displaying a battery charge level.

15. A method for displaying a secondary parameter of a portable personal computer, the computer having a controller that implements the method through execution of a keyboard service program, the computer also having a screen display, the method comprising:
displaying upon a parameter display region that is separate from the screen display at least one primary parameter; and
replacing, upon the parameter display region, the at least one primary parameter with a selected secondary parameter in response to a selection command for display of the secondary parameter.

16. The method of claim 15, wherein the primary and secondary parameters are at least partially displayed with a common set of icons.

17. The method of claim 16 further comprising the acts of (1) adjusting the secondary parameter in response to a selection command for adjustment of the secondary parameter, and (2) displaying upon the parameter display region the secondary parameter as it is being adjusted.

18. The method of claim 17 wherein the selection command for adjustment of the secondary parameter comprises user actuation of a predefined keystroke combination.

19. The method of claim 15, wherein primary and secondary parameters are alternately displayed upon the parameter display region with magnitude icons, whereby an indicative number of icons are activated to convey the relative magnitudes of the parameters being displayed.

20. The method of claim 19, wherein the act of displaying upon a parameter display region at least one primary parameter includes the act of displaying the charge level of a first battery supply for the computer.

21. The method of claim 20, wherein the act of displaying upon a parameter display region at least one primary parameter further includes the act of displaying the charge level of a second battery supply for the computer.

22. The method of claim 15, further comprising displaying on the parameter display region indicia identifying the secondary parameter being displayed.

23. A personal computer system having a screen display and a parameter display region for normally displaying a primary parameter and selectively displaying a secondary parameter, the system comprising:
a controller;
a keyboard for receiving input information from a user and translating the information into input signals that are communicated to the controller, the input information including a secondary parameter selection command; and
a status panel separate from the screen display the status panel having a parameter display region;
wherein, the controller causes the display region to display the relative magnitude of a selected secondary parameter in response to a corresponding keyboard input signal.

24. The personal computer system of claim 23 wherein the controller causes the display region to display the relative magnitude of at least one primary parameter instead of the secondary parameter after the secondary parameter has been displayed for at least a predetermined duration.

25. The computer system of claim 23 further including a battery control module providing a battery charge level signal from a battery supply to the controller to convey to the controller the relative charge level of the battery supply, wherein the primary parameter is the relative charge level of the battery supply.

26. The system of claim 23, wherein the secondary parameter is a user interface parameter.

27. The system of claim 23, wherein the parameter display region includes icons for alternately displaying the relative magnitudes of both the primary and secondary parameters.

28. The system of claim 27, wherein the controller causes the parameter display region to display the relative parameter magnitudes by activating a proportional number of icons from a set of icons that is associated with the displayed parameter.

29. The system of claim 28, wherein the computer is a portable personal computer and the parameter display region normally displays the charge levels of a first and a second battery.

30. The system of claim 29, wherein at least a portion of the icons used to display the charge levels of the first and second batteries are also used to display the relative magnitude of the secondary parameter.

31. The system of claim 30, wherein the secondary parameter is a user interface parameter.

32. The system of claim 23, wherein the secondary parameter selection command is conveyed by the keyboard through keystroke combinations.

33. The system of claim 23, wherein the parameter display region comprises indicia for identifying the secondary parameter being displayed.

34. A portable personal computer having a screen display comprising:
parameter display means separate from the screen display for normally displaying a primary parameter and selectively displaying a secondary parameter;
input means for generating a secondary parameter selection command; and
a controller for causing the parameter display means to display the secondary parameter in response to the secondary parameter selection command.

35. The computer of claim 34, wherein the controller is a keyboard controller executing a keyboard service program.

36. The computer of claim 34, wherein the secondary parameter selection command comprises a command to adjust the secondary parameter.

37. The computer of claim 36, wherein the input means generates the secondary parameter selection command in response to a predefined keystroke combination.

38. The computer of claim 36, wherein the controller implements an adjustment of the secondary parameter, as well as the display of the adjustment, independently of an executing operating system.

39. The computer of claim 34, wherein the parameter display means is an LCD status panel that includes a set of icons for alternately displaying the relative magnitudes of both the first and second parameters.

40. The computer of claim 39, wherein an indicative number of icons are activated in order to display relative parameter magnitudes.

41. The computer of claim 40, wherein the parameter display means includes indicia for identifying the secondary parameter being displayed.

42. A memory storage device having program instructions that when executed by a computer having a screen display cause the computer to perform a method for displaying a secondary parameter of the computer, the method comprising the steps of:

displaying upon a parameter display region that is separate from the screen display at least one primary parameter; and replacing, upon the parameter display region, the at least one primary parameter with a selected secondary parameter in response to a selection command for display of the secondary parameter.

43. The memory storage device of claim 42, wherein the primary and secondary parameters are at least partially displayed with a common set of icons.

44. The memory storage device of claim 43 further comprising instructions that when executed by the computer cause the computer to perform the acts of (1) adjusting the secondary parameter in response to a selection command for adjustment of the secondary parameter, and (2) displaying upon the parameter display region the secondary parameter as it is being adjusted.

45. The memory storage device of claim 44 wherein the selection command for adjustment of the secondary parameter comprises user actuation of a predefined keystroke combination.

46. The memory storage device of claim 42, wherein primary and secondary parameters are alternately displayed upon the parameter display region with magnitude icons, whereby an indicative number of icons are activated to convey the relative magnitudes of the parameters being displayed.

47. The memory storage device of claim 46, wherein the act of displaying upon a parameter display region at least one primary parameter includes the act of displaying the charge level of a first battery supply for the computer.

48. The memory storage device of claim 47, wherein the act of displaying upon a parameter display region at least one primary parameter further includes the act of displaying the charge level of a second battery supply for the computer.

49. The memory storage device of claim 42 further comprising instructions that when executed by the computer cause the computer to perform the act of displaying on the parameter display region indicia identifying the secondary parameter being displayed.

50. A method for displaying a secondary parameter on a parameter display region of a computer, the method comprising the steps of:

displaying on a parameter display region a primary parameter by activating icons from a first set of icons;

receiving a selection command for a secondary computer parameter, wherein the act of receiving the selection command for the secondary computer parameter occurs without assistance from an executing operating system; and responsive to the command, displaying on the parameter display region the secondary parameter by activating icons from a second set of icons, wherein the first and second sets of icons have icons in common.

51. A portable personal computer comprising:

parameter display means for normally displaying a primary parameter and selectively displaying a secondary parameter, input means for generating a secondary parameter selection command that includes a command to adjust the secondary parameter; and a controller for causing the parameter display means to display the secondary parameter in response to the secondary parameter selection command, wherein the controller implements an adjustment of the secondary parameter, as well as the display of the adjustment, independently of an executing operating system.

* * * * *